United States Patent
Kompfner

[11] 3,887,264
[45] June 3, 1975

[54] OPTICAL FIBER WITH ASYMMETRIC INDEX PROFILE

[75] Inventor: Rudolf Kompfner, Middletown, N.J.

[73] Assignee: Bell Telephone Laboratories, Incorporated, Murray Hill, N.J.

[22] Filed: May 18, 1973

[21] Appl. No.: 361,516

[52] U.S. Cl. ...... 350/96 WG; 65/DIG. 7; 350/96 R; 350/96 C
[51] Int. Cl. .............................................. G02b 5/14
[58] Field of Search .............................. 350/96 WG

[56] References Cited
UNITED STATES PATENTS

| | | | |
|---|---|---|---|
| 3,386,787 | 6/1968 | Kaplan | 350/96 WG |
| 3,434,774 | 3/1969 | Miller | 350/96 WG |
| 3,647,406 | 3/1972 | Fisher | 350/96 WG UX |
| 3,712,705 | 1/1973 | Marcatili | 350/96 WG |
| 3,817,730 | 6/1974 | Uchida | 350/96 WG X |

OTHER PUBLICATIONS
Ash et al., "Interconnection of Optical Fibers to Planar Optical Integrated Circuitry," IBM Technical Disclosure Bulletin, Vol. 13, No. 9, Feb. 1971, pp. 2529–2530.

*Primary Examiner*—John K. Corbin
*Attorney, Agent, or Firm*—S. Sherman

[57] ABSTRACT

This application describes a graded-index optical fiber comprising a core having at least one planar surface that extends in a direction parallel to the direction of wave propagation. The refractive index of the core material continuously decreases in the transverse direction from a maximum value at a point along the planar surface, to a minimum value at the other surfaces of the core. It is an advantage of this type of fiber that two sections can be spliced together by overlapping portions of their planar surfaces rather than by butt joining.

5 Claims, 4 Drawing Figures

OPTICAL FIBER WITH ASYMMETRIC INDEX PROFILE

This invention relates to graded-index optical waveguides.

BACKGROUND OF THE INVENTION

There is currently a great deal of interest in the use of solid core and liquid core dielectric waveguides at optical frequencies in much the same way as wires and conductively bounded waveguides are used at the lower frequencies. The conventional optical waveguide comprises a fiber-like dielectric core surrounded by a cladding of lower refractive index. The index discontinuity at the core-cladding interface serves to reflect the optical wave energy propagating therein and thereby to guide it along the fiber. More generally, guidance can be accomplished by any index profile which decreases from a maximum at the center of the fiber to a lower index at the outer periphery of the fiber as described, for example, in U.S. Pat. No. 3,434,774, issued to S. E. Miller on Mar. 25, 1969.

Studies have shown that the specific shape of the index profile has an effect upon the distribution of the guided optical energy within the fiber and upon the overall loss encountered. More importantly, the profile profoundly influences the group velocities of the various propagating modes. In particular, it has been shown by S. E. Miller in his article entitled "Light Propagation in Generalized Lens-Like Media," published in the November 1965 issue of the Bell System Technical Journal, that a parabolic distribution very nearly serves to equalize the group velocities of the propagating modes.

The ability to produce a low-loss fiber whose refractive index profile tends to minimize delay distortion greatly enhances the chances of using multimode fiber in optical communication systems. However, if such fibers are to be used in this manner, some convenient and inexpensive means must be available for splicing sections of fibers together in the course of their use. In all of the various techniques suggested to date, a butt joint is made. This requires that the two fiber sections to be spliced are accurately aligned since it is known that the transmission efficiency falls off markedly with even a very slight transverse misalignment of their longitudinal axes. Since the core diameter of such fibers is only about 50–100 $\mu$m, great care must be exercised in the manufacture and splicing of optical fibers. Accordingly, some form of optical waveguide that can be more easily spliced, without sacrificing the advantages of the graded-index fiber, is needed.

SUMMARY OF THE INVENTION

An optical fiber, in accordance with the present invention, comprises a core having an asymmetric graded-index profile, surrounded by a cladding of lower refractive index. Specifically, the core has at least one planar surface that extends in a direction parallel to the direction of wave propagation. The refractive index of the core material continuously decreases in the transverse direction from a maximum value at a point along the planar surface, to a minimum value at the other surfaces of said core.

In one embodiment of the invention, the core has a semicircular cross section. In a second embodiment of the invention, the core has a rectangular cross section.

A principal advantage of the invention is that sections of fibers can be spliced by overlapping the fibers along their planar surfaces, which is considerably easier to do than the prior art technique of butt joining them.

It is a further advantage of the invention that the rectangular core configuration is well suited to integrated optic applications.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
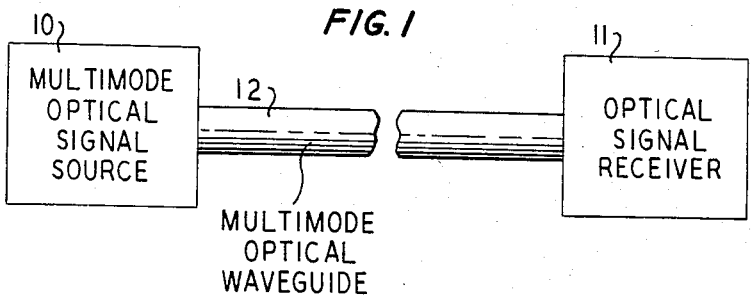
FIG. 1 shows, in block diagram, an optical communication system to which the invention relates.

Referring to the drawing, FIG. 1 shows, in block diagram, an optical communication system comprising a multimode optical signal source 10, an optical signal receiver 11, and a multimode optical waveguide 12 coupling the source to the receiver. The present invention relates particularly to waveguide 12, which is a graded-index optical fiber.

As disclosed in the above-identified patent, and in the article by S. E. Miller, one particularly advantageous form of a graded-index optical fiber is one whose index of refraction has the form $$n(r) = n \left( 1 - \frac{\Delta n}{n} \cdot \frac{r^2}{a^2} \right), \qquad (1)$$

where $n(r)$ is the refractive index at a distance $r$ from the center of the fiber;

$n$ is the refractive index at the center of the fiber;

$\Delta n$ is a constant; and $a$ is the radius of the fiber.

Figure 2:
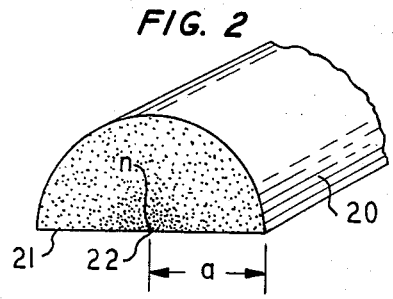
FIG. 2 shows an optical fiber, in accordance with the present invention, for use in the system of FIG. 1.

The present invention is based upon the discovery that one-half of a graded-index fiber of the type described is as good as a whole one for most purposes, and better than a whole one for some purposes. Accordingly, a first embodiment of the present invention comprises a fiber 20 having a semicircular cross section, as illustrated in FIG. 2. The refractive index is a maximum at a point 22, located at the center of the planar surface 21 of the fiber, and decreases to a minimum value at the periphery of the fiber, as indicated by the density of the stippling. The fiber can be enclosed in a protective jacket, or surrounded directly by a gas of lower refractive index, such as the air.

Figure 3:
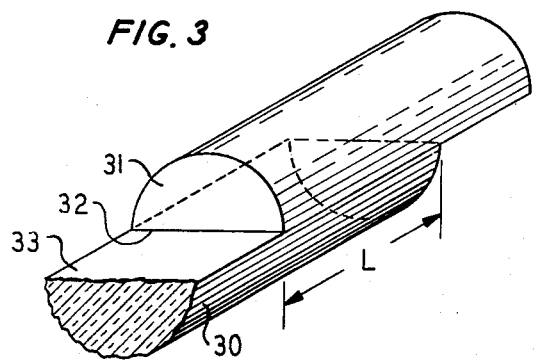
FIG. 3 shows the manner of splicing the fiber illustrated in FIG. 2.

As indicated hereinabove, one of the principal obstacles to the use of prior art optical fibers is the difficulty of splicing sections of fibers together. This difficulty is totally avoided by using the graded-index half-guide since it is no longer necessary to butt join the fibers. Instead, they can be ready spliced simply by overlapping them, as illustrated in FIG. 3, which shows two half-guides 30 and 31 oriented such that planar surface 33 of half-guide 30 is in contact with the planar surface 32 of half-guide 31 over an interval L.

As is known, a ray propagating along a full graded-index guide will oscillate to and fro with a wavelength $$\lambda = \frac{2\pi a}{(2 \frac{\Delta n}{n})^{1/2}} . \qquad (2)$$

as illustrated on page 2021 of the above-identified article by S. E. Miller. In the half-guide, the rays will execute half oscillations, bouncing as they are reflected at the planar surface. However, over the overlap interval L, the two half-guides 30 and 31 are the equivalent of a full guide such that a ray in one half-guide will cross over and enter into the other half-guide. The amount of coupling between half-guides 30 and 31 thus produced varies as a function of the overlap distance L, and is a maximum when L is equal to an integral number of half-wavelengths. That is, maximum coupling is obtained when $$L = (\tfrac{1}{2}\lambda)m \qquad (3)$$

where $m$ is an integer.

Figure 4:
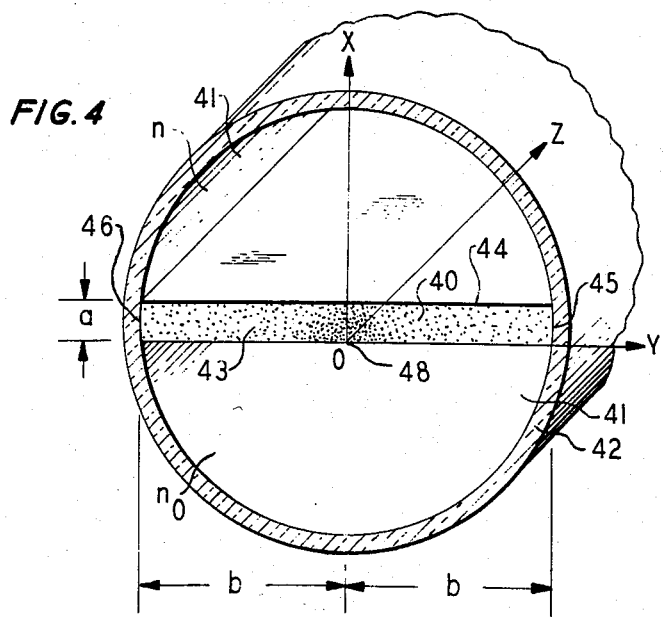
FIG. 4 shows a second embodiment of a fiber in accordance with the invention.

FIG. 4 shows a second embodiment of the invention wherein waveguide 12 comprises a thin strip 40 of a low-loss material disposed within and supported by a hollow tube 42. As illustrated, strip 40 has a substantially rectangular cross section whose wide dimension is $2b$ and whose narrow dimension is $a$. The region 41 above and below strip 40 is filled with a gas such as air.

As in the embodiment of FIG. 2, strip 40 is characterized by a refractive index profile that is a maximum at a point 48 along one of its broad surfaces 43, and which decreases to a minimum value at the upper surface 44 and the sides 45 and 46. In the case of a square-law variation, and with point 48 at the center of the strip, the refractive index profile, with respect to an $x$–$y$–$z$ coordinate system whose axes pass through point 48, is given approximately by $$n(x,y) \approx n \left(1 - \frac{\Delta n}{n} \frac{x^2}{a^2}\right) \left(1 - \frac{\Delta n}{n} \frac{y^2}{b^2}\right), \qquad (4)$$

where $n$ is the refractive index at point 48;

the $x$ axis is directed parallel to the narrow dimension of strip 40;

the $y$ axis is directed parallel to the wide dimension of strip 40;

the $z$ axis is directed parallel to the direction of wave propagation;

$0 < x \leq a$; and $y \leq b$.

In addition to the relative ease of splicing a graded-index half-guide, as described hereinabove, the flat-strip geometry of the embodiment illustrated in FIG. 4 is particularly adapted to integrated optical circuitry, wherein diffusion, ion-implantation or ionic replacement techniques can be readily employed to produce the graded-index profile. In all other respects, including attenuation and delay distortion, the half-fiber is comparable to the well known full guide and can be used in all cases in the same manner as the full guide.

It is apparent that the two guides shown are merely illustrative of but two of the many specific embodiments which can represent applications of the principles of the invention. Thus numerous and various other arrangements can readily be devised in accordance with these principles by those skilled in the art without departing from either the spirit or scope of the invention.

I claim:

1. A pair of optical waveguides, each of which includes an elongated core, characterized in that:

each waveguide has a region along which the core portion has at least one planar surface that extends in a direction parallel to the direction of wave propagation;

the refractive index of each of said core portions decreases continuously in a transverse direction from a maximum at a point along said planar surface, to a minimum at the surfaces of said core;

the planar surfaces of said core portions overlap and are in contact to form a splice;

and in that said overlapping core portions are surrounded by material having a refractive index that is no greater than the minimum refractive index at said core surfaces.

2. The waveguides according to claim 1 wherein said core has a semicircular cross section.

3. The waveguides according to claim 1 wherein said core has a rectangular cross section.

4. The waveguides according to claim 1 wherein said core is surrounded by an outer jacket;

and wherein the refractive index of the region between said core and said jacket has a lower refractive index than said core.

5. The waveguides according to claim 1 wherein the refractive index decreases as a function of the square of the distance from said point of maximum refractive index.

* * * * *